US011462112B2

(12) United States Patent
Tran et al.

(10) Patent No.: US 11,462,112 B2
(45) Date of Patent: Oct. 4, 2022

(54) MULTI-TASK PERCEPTION NETWORK WITH APPLICATIONS TO SCENE UNDERSTANDING AND ADVANCED DRIVER-ASSISTANCE SYSTEM

(71) Applicant: NEC Laboratories America, Inc., Princeton, NJ (US)

(72) Inventors: Quoc-Huy Tran, Santa Clara, CA (US); Samuel Schulter, New York, NY (US); Paul Vernaza, Sunnyvale, CA (US); Buyu Liu, Cupertino, CA (US); Pan Ji, San Jose, CA (US); Yi-Hsuan Tsai, San Jose, CA (US); Manmohan Chandraker, Santa Clara, CA (US)

(73) Assignee: NEC Corporation

( * ) Notice: Subject to any disclaimer, the term of this patent is extended or adjusted under 35 U.S.C. 154(b) by 442 days.

(21) Appl. No.: 16/787,727

(22) Filed: Feb. 11, 2020

(65) Prior Publication Data

US 2020/0286383 A1 Sep. 10, 2020

Related U.S. Application Data (60) Provisional application No. 62/814,886, filed on Mar. 7, 2019.

(51) Int. Cl.
*G08G 1/16* (2006.01)
*G06N 3/08* (2006.01)
(Continued)

(52) U.S. Cl.
CPC ............ *G08G 1/162* (2013.01); *B60W 10/18* (2013.01); *B60W 10/20* (2013.01);
(Continued)

(58) Field of Classification Search
CPC ..... B60W 10/18; B60W 10/20; G06F 9/3005; G06K 9/6271; G06N 3/0454; G06N 3/08;
(Continued)

(56) References Cited

U.S. PATENT DOCUMENTS

| 2011/0170781 A1* | 7/2011 | Bronstein ................ G06K 1/00 382/190 |
| 2015/0112182 A1* | 4/2015 | Sharma .................. A61B 6/032 600/408 |

(Continued)

OTHER PUBLICATIONS

Chabot et al., "Deep Manta: A Coarse-to-fine Many-Task Network for joint 2D and 3D vehicle analysis from monocular image", CVPR, Mar. 2017, pp. 2040-2049.

(Continued)

*Primary Examiner* — Babar Sarwar
(74) *Attorney, Agent, or Firm* — Joseph Kolodka (57) ABSTRACT

A method is provided in an Advanced Driver-Assistance System (ADAS). The method extracts, from an input video stream including a plurality of images using a multi-task Convolutional Neural Network (CNN), shared features across different perception tasks. The perception tasks include object detection and other perception tasks. The method concurrently solves, using the multi-task CNN, the different perception tasks in a single pass by concurrently processing corresponding ones of the shared features by respective different branches of the multi-task CNN to provide a plurality of different perception task outputs. Each respective different branch corresponds to a respective one of the different perception tasks. The method forms a parametric representation of a driving scene as at least one top-view map responsive to the plurality of different perception task outputs. The method controls an operation of the vehicle for collision avoidance responsive to the at least one top-view map indicating an impending collision.

20 Claims, 6 Drawing Sheets

(51) Int. Cl.
  *G06F 9/30* (2018.01)
  *B60W 10/20* (2006.01)
  *B60W 10/18* (2012.01)
  *G06V 10/75* (2022.01)
  *G06V 20/56* (2022.01)

(52) U.S. Cl.
  CPC ............. *G06F 9/3005* (2013.01); *G06N 3/08* (2013.01); *G06V 10/751* (2022.01); *G06V 20/56* (2022.01)

(58) Field of Classification Search
  CPC .... G06V 10/454; G06V 10/751; G06V 10/82; G06V 20/56; G06V 20/58; G08G 1/162; G08G 1/166
  See application file for complete search history.

(56) References Cited

U.S. PATENT DOCUMENTS

| | | | | |
|---|---|---|---|---|
| 2016/0093048 A1* | 3/2016 | Cheng | ................. | G06K 9/6215 382/131 |
| 2016/0103213 A1* | 4/2016 | Ikram | ..................... | G01S 13/42 342/105 |
| 2016/0259330 A1* | 9/2016 | Lacaze | ................. | G05D 1/0016 |
| 2018/0130355 A1* | 5/2018 | Zia | ......................... | G06V 20/64 |
| 2018/0209681 A1* | 7/2018 | Song | ........................ | F24F 11/77 |
| 2019/0250891 A1* | 8/2019 | Kumar | ................. | G06K 9/6218 |
| 2019/0287404 A1* | 9/2019 | Vernaza | ................. | G06N 5/046 |
| 2022/0165045 A1* | 5/2022 | Jiang | ...................... | G06V 10/82 |

OTHER PUBLICATIONS

Kendall et al., "Multi-Task Learning Using Uncertainty to Weigh Losses for Scene Geometry and Semantics", CVPR, Mar. 2017, pp. 7482-7491.

Kundu et al., "3D-RCNN: Instance-level 3D Object Reconstruction via Render-and-Compare", CVPR Jun. 2018, pp. 3559-3568.

Long et al., "Fully Convolutional Networks for Semantic Segmentation", CVPR, Mar. 2015, 10 pages.

Ren et al., "Faster R-CNN: Towards Real-Time Object Detection with Region Proposal Networks", arXiv:1506.01497v3 [cs.CV] Jan. 6, 2016, pp. 1-14.

Xu, "Multi-Level Fusion based 3D Object Detection from Monocular Images", CVPR, Jun. 2018, pp. 2345-2353.

* cited by examiner

MULTI-TASK PERCEPTION NETWORK WITH APPLICATIONS TO SCENE UNDERSTANDING AND ADVANCED DRIVER-ASSISTANCE SYSTEM

RELATED APPLICATION INFORMATION

This application claims priority to U.S. Provisional Patent Application No. 62/814,886, filed on Mar. 7, 2019, incorporated herein by reference herein its entirety.

BACKGROUND

Technical Field

The present invention relates to machine learning and more particularly to a multi-task perception network with applications to scene understanding and an advanced driver-assistance system.

Description of the Related Art

Many scene understanding systems and advanced driver-assistance systems require performing a variety of perception tasks such as object detection, semantic segmentation, and depth estimation, which are usually considered as separate modules and implemented as independent convolutional neural networks (CNN). However, there are a few drawbacks with the above approach. Firstly, it requires many computing resources, e.g., one graphics processing unit (GPU) is needed for running a task-specific network. Secondly, it ignores mutual features between individual perception tasks such as object detection and semantic segmentation. Thus, there is a need for an improved approach for using a multi-task perception network for scene understanding and advanced driver-assistance systems.

SUMMARY

According to an aspect of the present invention, a computer-implemented method is provided in an Advanced Driver-Assistance System (ADAS). The method includes extracting, by a hardware processor from an input video stream including a plurality of images using a multi-task Convolutional Neural Network (CNN), shared features across different perception tasks. The different perception tasks include object detection and other perception tasks. The method further includes concurrently solving, by the hardware processor using the multi-task CNN, the different perception tasks in a single pass by concurrently processing corresponding ones of the shared features by respective different branches of the multi-task CNN to provide a plurality of different perception task outputs. Each of the respective different branches corresponds to a respective one of the different perception tasks. The method also includes forming a parametric representation of a driving scene as at least one top-view map responsive to the plurality of different perception task outputs. The method additionally includes controlling an operation of the vehicle for collision avoidance responsive to the at least one top-view map indicating an impending collision.

According to another aspect of the present invention, a computer program product is provided for advanced driver-assistance. The computer program product includes a non-transitory computer readable storage medium having program instructions embodied therewith. The program instructions are executable by a computer to cause the computer to perform a method. The method includes extracting, from an input video stream including a plurality of images using a multi-task Convolutional Neural Network (CNN), shared features across different perception tasks. The different perception tasks include object detection and other perception tasks. The method further includes concurrently solving, using the multi-task CNN, the different perception tasks in a single pass by concurrently processing corresponding ones of the shared features by respective different branches of the multi-task CNN to provide a plurality of different perception task outputs. Each of the respective different branches corresponds to a respective one of the different perception tasks. The method also includes forming, by the hardware processor, a parametric representation of a driving scene as at least one top-view map responsive to the plurality of different perception task outputs. The method additionally includes controlling, by the hardware processor, an operation of the vehicle for collision avoidance responsive to the at least one top-view map indicating an impending collision.

According to yet another aspect of the present invention, a computer processing system is provided for advanced driver-assistance. The computer processing system includes a memory device including program code stored thereon. The computer processing system further includes a hardware processor, operatively coupled to the memory device, and configured to run the program code stored on the memory device to extract, from an input video stream including a plurality of images using a multi-task Convolutional Neural Network (CNN), shared features across different perception tasks. The different perception tasks including object detection and other perception tasks. The hardware processor further runs the program code to concurrently solve, using the multi-task CNN, the different perception tasks in a single pass by concurrently processing corresponding ones of the shared features by respective different branches of the multi-task CNN to provide a plurality of different perception task outputs. Each of the respective different branches corresponding to a respective one of the different perception tasks. The hardware processor further runs the program code to form a parametric representation of a driving scene as at least one top-view map responsive to the plurality of different perception task outputs. The hardware processor also runs the program code to control an operation of the vehicle for collision avoidance responsive to the at least one top-view map indicating an impending collision.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to a multi-task perception network with applications to scene understanding and an Advanced Driver-Assistance System (ADAS).

One or more embodiments of the present invention propose a multi-task perception network which explores mutual features between individual perception tasks and runs efficiently on a single GPU. In addition, we demonstrate the applications of the proposed invention towards scene understanding and advanced driver-assistance systems.

In an embodiment, the present invention proposes a novel CNN architecture for simultaneously performing different perception tasks such as object detection, semantic segmentation, depth estimation, occlusion reasoning, and 3D object localization from a single input image. In particular, the input image is first passed through a feature extraction module which extracts features for sharing across different perception tasks. Those shared features are then fed to task-specific branches with each performing one or more perception tasks. By sharing the feature extraction module, the network of the present invention is able to explore shared features between individual perception tasks and run efficiently on a single GPU. In addition, the applications of the multi-task perception network are described towards scene understanding and advanced driver-assistance systems. Of course, the present invention can be applied to other applications, as readily appreciated by one of ordinary skill in the art, given the teachings of the present invention provided herein.

Figure 1:
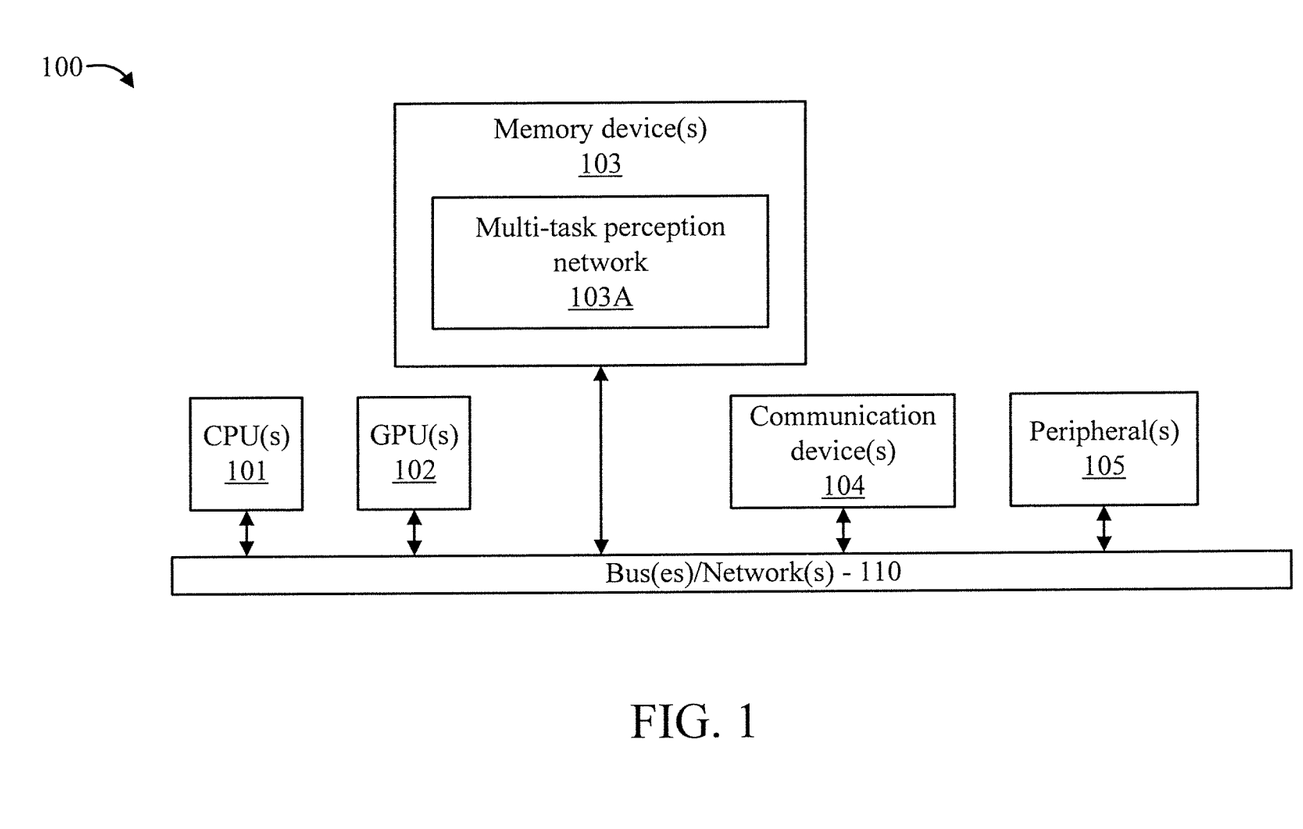
FIG. 1 is a block diagram showing an exemplary processing system, in accordance with an embodiment of the present invention.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention. In an embodiment, the memory devices 103 include a multi-task perception network 103A for scene understanding and an Advanced Driver-Assistance System (ADAS).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 2:
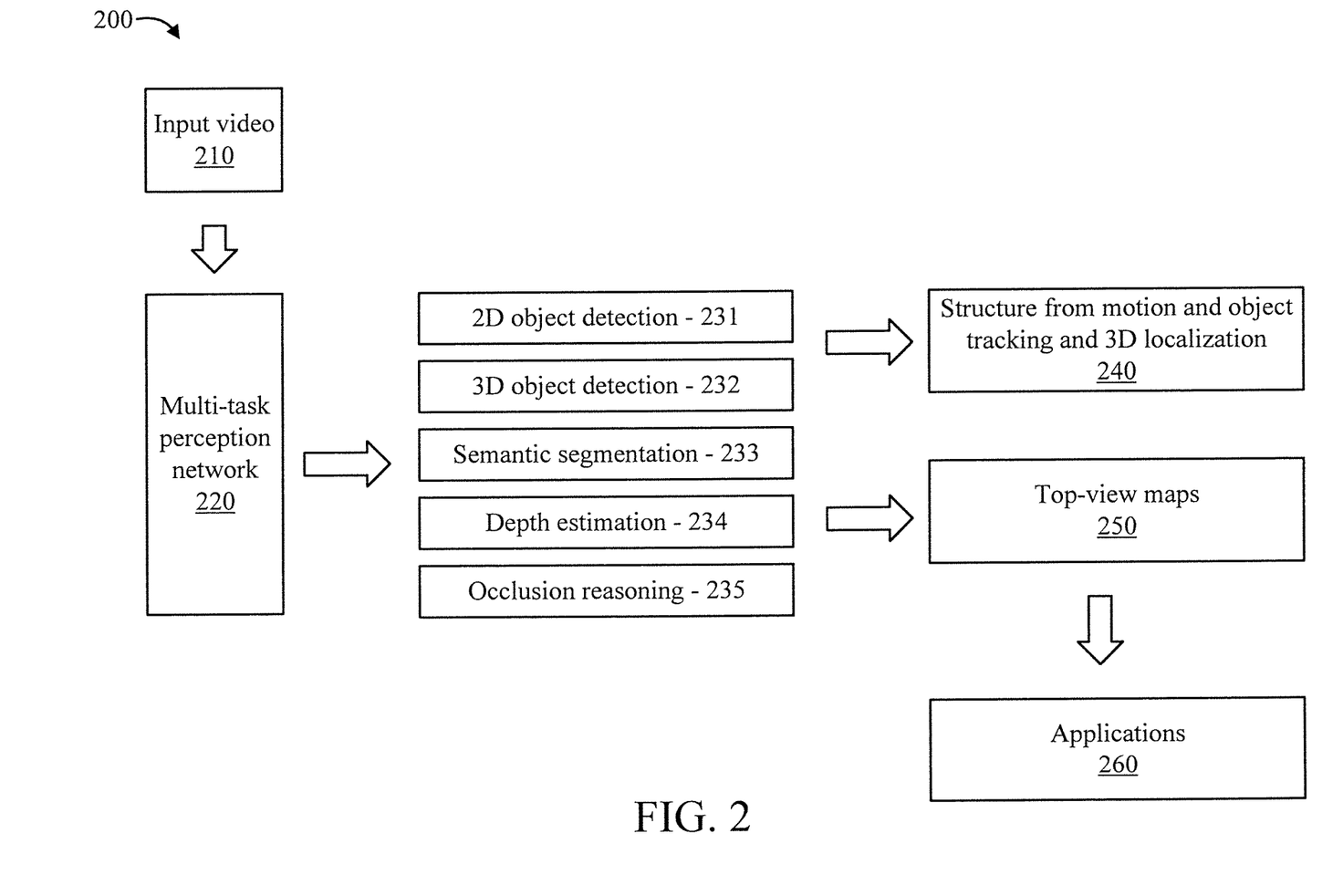
FIG. 2 is a diagram showing an exemplary application overview, in accordance with an embodiment of the present invention.

FIG. 2 is a diagram showing an exemplary application overview 200, in accordance with an embodiment of the present invention.

The application overview 200 involves an input video 210, a multi-task perception network 220, 2D object detection 231, 3D object detection 232, semantic segmentation 233, depth estimation 234, occlusion reasoning 235, a structure from motion and object tracking and 3D localization 240, top-view maps 250, and scene understanding and advanced driver-assistance systems applications 260.

FIG. 2 illustrates exemplary applications of a multi-task perception network, including scene understanding and ADAS 260. In particular, given an input video 210, the perception network 220 processes each frame separately in a single forward pass and produces rich per-frame outputs including 2D object detection 231, 3D object detection 232, semantic segmentation 233, depth estimation 234, and occlusion reasoning 235. These per-frame outputs can then be combined and fed into structure from motion, object tracking, 3D localization 240, and top-view map estimation modules to produce a temporally and spatially consistent top-view map 250 representation of the captured scene, including the details of the scene layout such as the number of lanes, the road topology, and the distance to intersection, as well as the localization of the objects that is consistent with the scene layout. The detailed top-view map representation can then be useful for different applications such as scene understanding and ADAS 260 (e.g., blind-spot reasoning, path planning, collision avoidance (through steering, braking inputs, etc.), etc.

Figure 3:
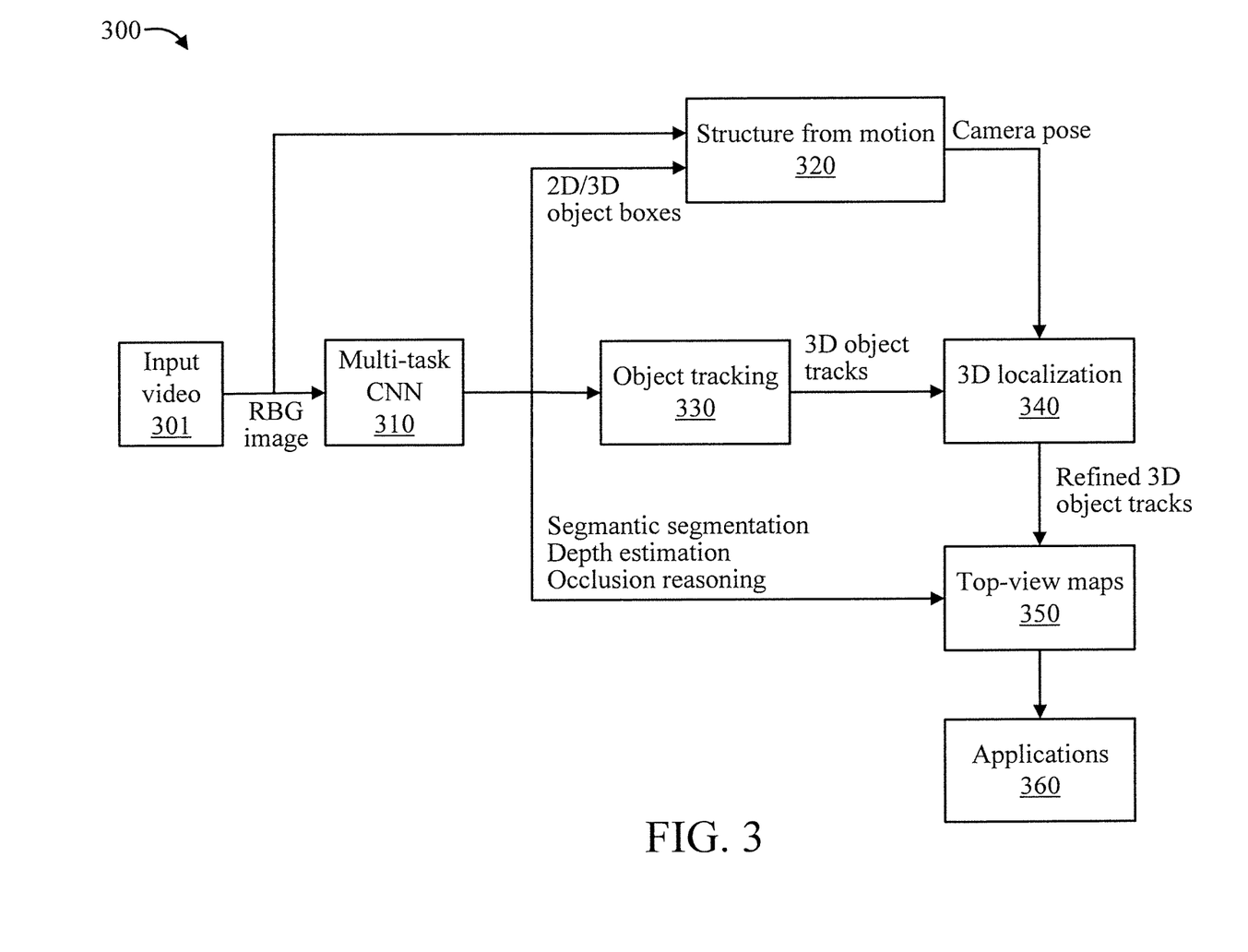
FIG. 3 is a block diagram showing an exemplary multi-task perception network, in accordance with an embodiment of the present invention.

FIG. 3 is a block diagram showing an exemplary multi-task perception network 300, in accordance with an embodiment of the present invention.

The network 300 receives an input video 301.

The network includes a multi-task Convolutional Neural Network (CNN) 310, a structure from motion component 320, an object tracking component 330, a 3D localization component 340, top-view maps 350, and applications 360.

Regarding the input video 301, the same can be a video stream of images (e.g., RGB or other type).

Regarding the multi-task CNN 310, the same takes as input an (RGB) image and produces a multitude of outputs. The multi-task CNN 310 is configured to solve multiple tasks at once.

Regarding the object tracking component 330, the same receives 2D or 3D bounding boxes of object instances from the multi-task CNN 310 for every frame of the input video 301. The object tracking component 330 can operate with both 2D and/or 3D bounding boxes. The task of the object tracking component 330 is to associate the 2D/3D bounding boxes across different frames, i.e., across time. An association between bounding boxes indicates that these bounding boxes capture the exact same instance of an object.

Regarding the structure from motion component 320, the same takes as input the video stream of RGB images 301 and outputs the relative camera pose to the first frame of the video. Thus, the structure from motion component 320 measures how the camera itself is moving through space and time. The input of 2D or 3D bounding boxes helps the structure from motion component 320 to improve its estimate, because it can ignore dynamic parts of the scene which do not fulfill its internal assumptions about a static world.

Regarding the 3D localization component 340, the same integrates the estimated camera pose and the per-frame 3D bounding boxes to predict refined 3D bounding boxes that are consistent over time.

Regarding the top-view maps 350, the same generate a consistent semantic representation of the captured scene from a top view. The top view maps 350 integrate multiple outputs from the multi-task CNN 310, namely occlusion-reasoned per-pixel semantics and depth estimates, as well as the refined 3D bounding boxes from the 3D localization component 340. The output is a parametric representation of complex driving scenes, including the number of lanes, the topology of road layouts, distances to intersections, existence of crosswalks and sidewalks and several more attributes. It also provides a localization of the object instances (given from the 3D localization component 340) that is consistent with the scene layout.

Regarding the applications 360, the semantic and parametric top-view representation given by the top-view maps 350 is a useful abstraction of the scene and can serve many different applications. Since it reasons about occluded areas, one application is blind spot reasoning. Since it includes a metrically correct description of the road layout, another application can be path planning. These are only two examples of potential applications that build on top of the output of the top-view maps 350.

Figure 4:
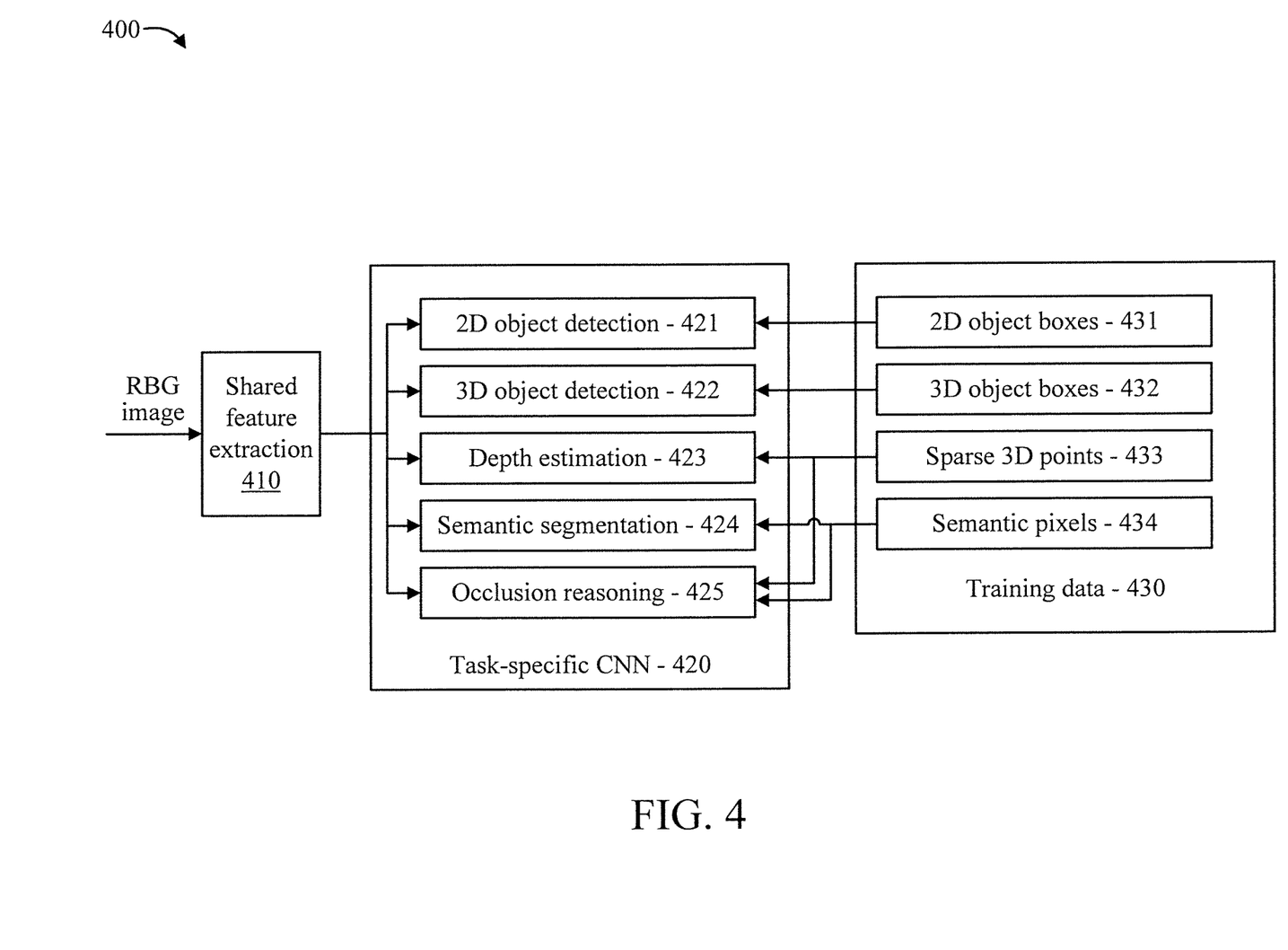
FIG. 4 is a block diagram further showing the multi-task CNN of FIG. 3, in accordance with an embodiment of the present invention.

FIG. 4 is a block diagram further showing the multi-task CNN 310 of FIG. 3, in accordance with an embodiment of the present invention.

The multi-task CNN 310 includes a shared feature extraction component 410, a task-specific CNN 420, and training data 430.

The task-specific CNN 420 include a 2D object detection component 421, a 3D object detection component 422, a depth estimation component 423, a semantic segmentation component 424, and an occlusion reasoning component 425.

The training data 430 includes 2D object boxes 431, 3D object boxes 432, sparse 3D points 433, and semantic pixels 434. A sparse 3D point is a real point in 3D space relative to the camera that also captures the distance to the camera. Such sparse 3D points are typically collected with a Laser Scanner (Lidar) and help the network to estimate distances to objects.

As described above, the multi-task CNN 310 takes as input an RGB image and produces a multitude of outputs (for the task-specific CNN 420). The ballpark of the computation is still shared for all different outputs. The shared feature extraction component 410 and the task-specific CNN 420 are implemented as one joint convolutional neural network with several parameters that need to be estimated with the training data 430.

Regarding the shared feature extraction component 410, the same is represented as a convolutional neural network (CNN). The specific architecture of this CNN can be chosen arbitrarily as long as it produces a feature map of spatial dimensions proportional to the input image. The architecture can be adapted depending on the computational resources available, which enables heavy and strong feature representations for offline applications as well as weaker but lighter feature representations for real-time applications.

Regarding the task-specific CNN 420, given the shared feature representation from block 210, the CNN 420 applies several task-specific sub-CNNs on top of it. These sub-CNNs are light-weight and require only a fraction of the runtime compared to the shared feature extraction component 410. This enables the ability to estimate the output of a multitude of tasks without significantly increasing the overall runtime of the system. In one embodiment, the following outputs are estimated:

Various components of the task-specific CNN 420 will now be described, in accordance with one or more embodiments of the present invention.

Regarding the 2D object detection component 421, this output is a list of bounding boxes (4 coordinates in image space, a confidence score and a category label) that delineates the extent of all instances of a pre-defined set of object categories, for instance, cars, persons, stop-signs, traffic lights, etc.

Regarding the 3D object detection component 422, for each detected object in 2D (from the 2D object detection component 421), the system estimates the 3D bounding box enclosing that object in the actual 3D space (e.g., in meters or some other unit). This estimate provides the 3D location, orientation, and dimension for each object, which are crucial information to fully understand the captured scene.

Regarding the depth estimation component 423, the same assigns each pixel in the input image a distance (e.g., in meters or some other unit).

Regarding the semantic segmentation component 424, the same assigns each pixel in the input image a semantic category, like road, sidewalk, building, sky, car or person. The preceding listing is not limiting. The set of categories is different from the set of categories in the 2D object detection component 421, although some items are equal. Importantly, the set in the semantic segmentation component 424 includes categories that cannot be delineated well with a bounding box, for instance the road.

Regarding the occlusion reasoning component 425, the same estimates the semantics and the distances for all pixels that are occluded by foreground objects. A subset of the categories from the semantic segmentation component 424 are defined as foreground categories that can occlude the scene, like cars, pedestrians or poles. The preceding listing is not limiting. All pixels assigned to these categories in the output of the semantic segmentation component 424, which is also input to the occlusion reasoning component 425, are marked as occluded areas. The occlusion reasoning component 425 assigns a category (from the set of background categories) to each occluded area as if it was not occluded. The occlusion reasoning component 425 is essentially leveraging context information surrounding the occluded pixels as well as an automatically learned prior from training data to estimate semantic categories for occluded pixels. The same happens for distances in occluded areas. Importantly, as with all other components, the occlusion reasoning component 425 only works on the feature representation given by the shared feature extraction component 410 and also only adds minor runtime to the overall system.

Regarding the training data 430, the same is required in order to estimate the parameters of the convolutional neural network (CNN) described with respect to the shared feature extraction component 410 and the task-specific CNN 420. Again, the CNN is a unified model that can be trained end-to-end, i.e., given an input RGB image and a ground truth data for any of the above defined tasks. In order to better leverage data, in an embodiment, we do not make the restrictive assumption that each input image is annotated for all tasks. In an embodiment, we only require that an image is annotated for at least one task. Then, given an input RGB image and ground truth data for one (or more) task(s), the training algorithm updates the parameters relevant for this (these) task(s). Note that the shared feature representation from the shared feature extraction component 410 is always involved. These updates are repeated with images and ground truth for all different tasks until the parameters are converged according to some loss functions for all tasks. The ground truth data required to train our multi-task CNN is the following: 2D bounding boxes 431; 3D bounding boxes 432; sparse 3D points 433 (for instance, from a laser scanner), and semantic categories for each pixel (semantic pixels 434).

It is important to note that the occlusion reasoning component 425 does not require annotations for occluded areas of the scene, which would be costly and hard to acquire.

Figure 5:
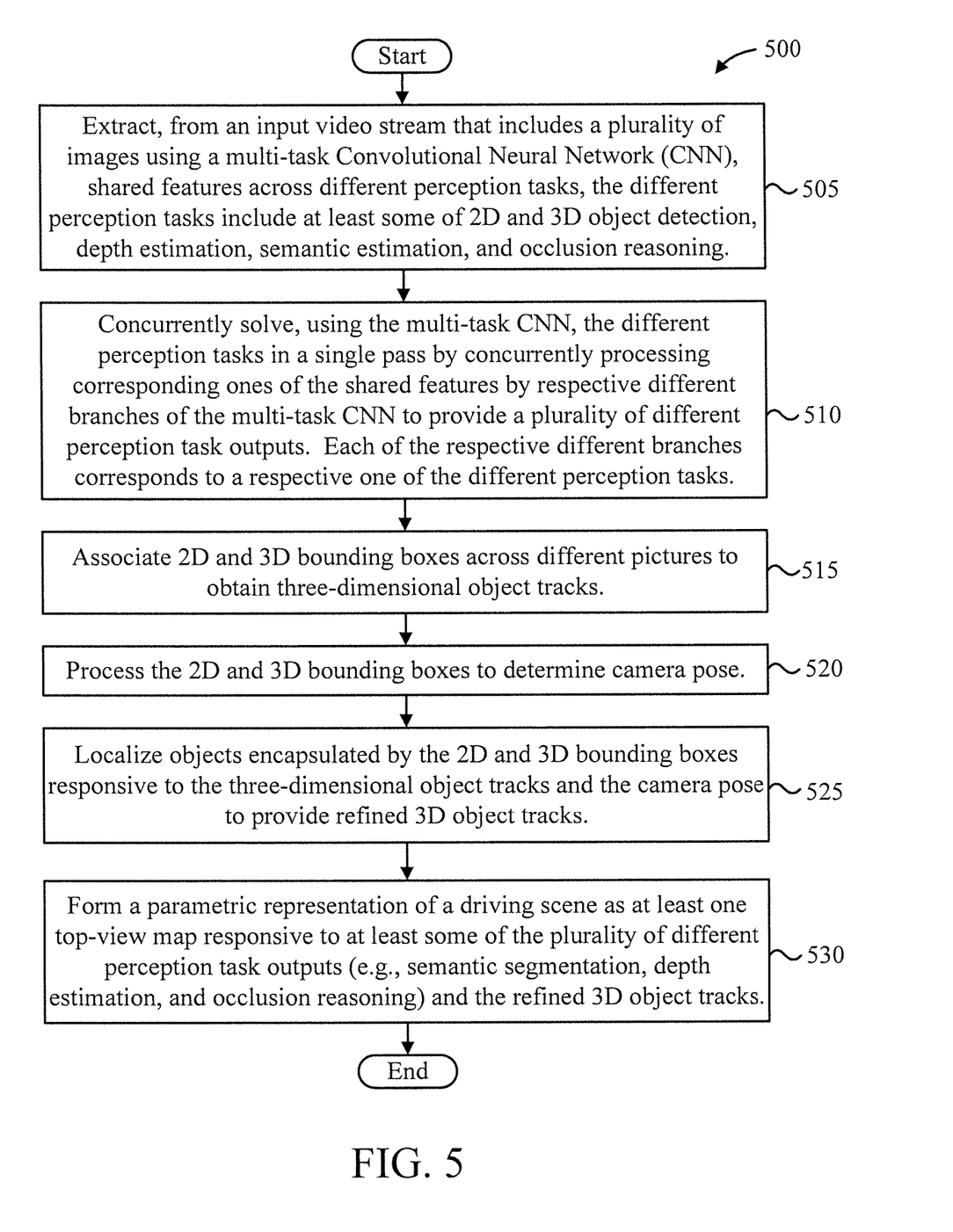
FIG. 5 is a flow diagram showing an exemplary method for multi-task perception network, in accordance with an embodiment of the present invention.

FIG. 5 is a flow diagram showing an exemplary method 500 for multi-task perception network, in accordance with an embodiment of the present invention. The method 500 can be applied to applications involved scene understanding and an ADAS.

At block 505, extract, from an input video stream that includes a plurality of images using a multi-task Convolutional Neural Network (CNN), shared features across different perception tasks, the different perception tasks include at least some of 2D and 3D object detection, depth estimation, semantic estimation, and occlusion reasoning.

At block 510, concurrently solve, using the multi-task CNN, the different perception tasks in a single pass by concurrently processing corresponding ones of the shared features by respective different branches of the multi-task CNN to provide a plurality of different perception task outputs. Each of the respective different branches corresponds to a respective one of the different perception tasks.

At block 515, associate 2D and 3D bounding boxes across different pictures to obtain three-dimensional object tracks.

At block 520, process the 2D and 3D bounding boxes to determine camera pose.

At block 525, localize objects encapsulated by the 2D and 3D bounding boxes responsive to the three-dimensional object tracks and the camera pose to provide refined 3D object tracks.

At block 530, form a parametric representation of a driving scene as at least one top-view map responsive to at least some of the plurality of different perception task outputs (e.g., semantic segmentation, depth estimation, and occlusion reasoning) and the refined 3D object tracks. It is noted that the remaining ones of the plurality of different perception task outputs were used to form the refined 3D object tracks.

At block 535, control an operation of the vehicle for collision avoidance responsive to the at least one top-view map indicating an impending collision.

Figure 6:
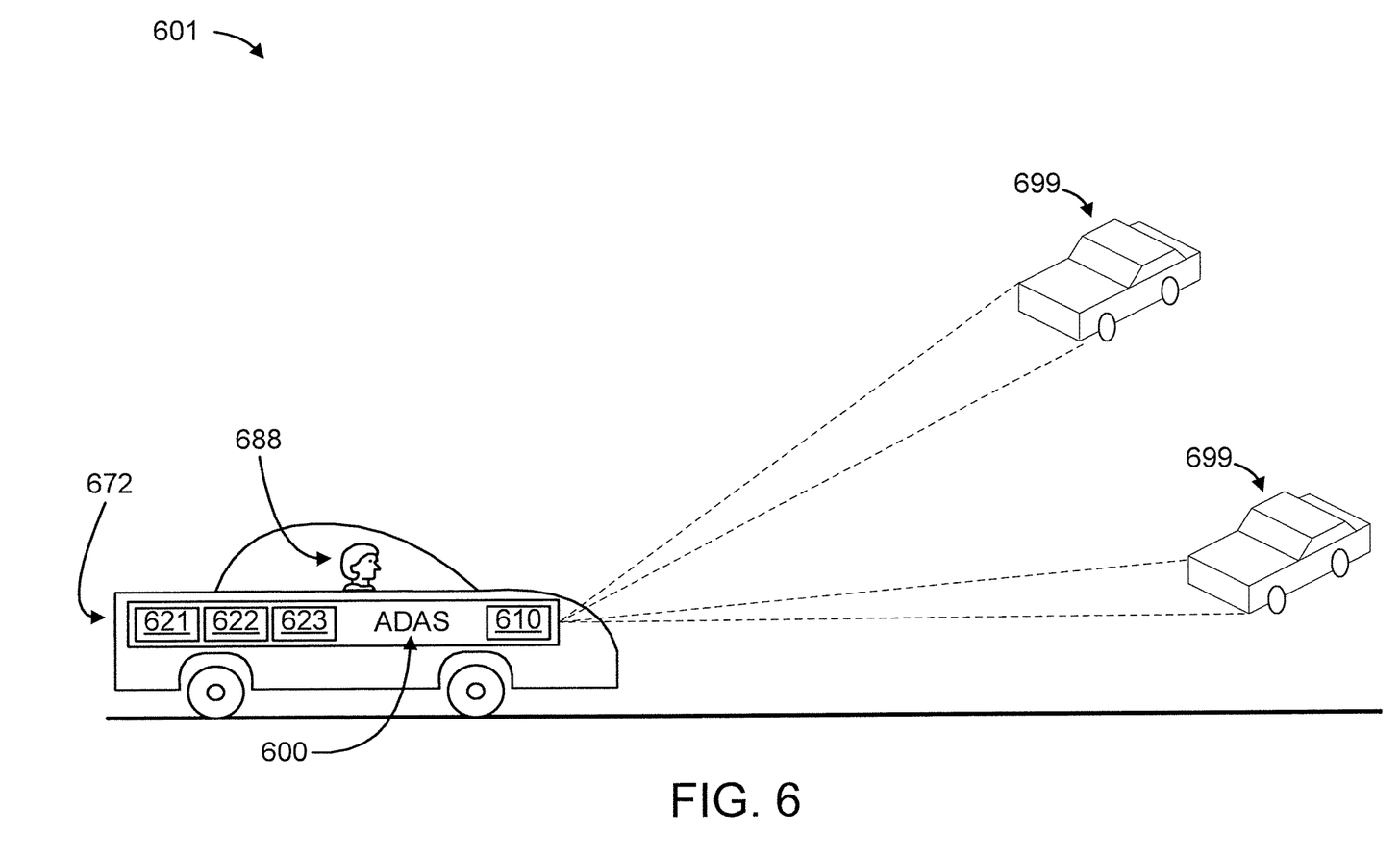
FIG. 6 is a block diagram showing an exemplary Advanced Driver-Assistance System (ADAS), in accordance with an embodiment of the present invention.

FIG. 6 shows an exemplary Advanced Driver-Assistance System (ADAS) 600 based on tracking object detections, in accordance with an embodiment of the present invention.

The ADAS 600 is used in an environment 601 wherein a user 2688 is located in a scene with multiple objects 699, each having their own locations and trajectories. The user 688 is operating a vehicle 672 (e.g., a car, a truck, a motorcycle, etc.).

The ADAS 600 includes a camera system 610. While a single camera system 610 is shown in FIG. 2 for the sakes of illustration and brevity, it is to be appreciated that multiple camera systems can be also used, while maintaining the spirit of the present invention. The ADAS 600 further includes a server 620 configured to perform object detection in accordance with the present invention. The server 620 can include a processor 621, a memory 622, and a wireless transceiver 623. The processor 621 and the memory 622 of the remote server 620 can be configured to perform driver assistance functions based on images received from the camera system 610 by the (the wireless transceiver 623 of) the remote server 620. In this way, corrective action can be taken by the user 688 and/or the vehicle 672.

The ADAS 600 can interface with the user through one or more systems of the vehicle 672 that the user is operating. For example, the ADAS 600 can provide the user information (e.g., detected objects, their locations, suggested actions, etc.) through a system 672A (e.g., a display system, a speaker system, and/or some other system) of the vehicle 672. Moreover, the ADAS 600 can interface with the vehicle 672 itself (e.g., through one or more systems of the vehicle 672 including, but not limited to, a steering system, a braking system, an acceleration system, a steering system, etc.) in order to control the vehicle or cause the vehicle 672 to perform one or more actions. In this way, the user or the vehicle 672 itself can navigate around these objects 699 to avoid potential collisions there between.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method in an Advanced Driver-Assistance System (ADAS), comprising: extracting, by a hardware processor from an input video stream comprising a plurality of images using a multi-task Convolutional Neural Network (CNN), shared features across different perception tasks, the different perception tasks comprising object detection and other perception tasks; concurrently solving, by the hardware processor using the multi-task CNN, the different perception tasks in a single pass by concurrently processing corresponding ones of the shared features by respective different branches of the multi-task CNN to provide a plurality of different perception task outputs, each of the respective different branches corresponding to a respective one of the different perception tasks; forming a parametric representation of a driving scene as at least one top-view map responsive to the plurality of different perception task outputs; and controlling an operation of a vehicle for collision avoidance responsive to the at least one top-view map indicating an impending collision.

2. The computer-implemented method of claim 1, wherein the other perception tasks comprise semantic segmentation, depth estimation, and occlusion reasoning.

3. The computer-implemented method of claim 1, wherein the hardware processor consists of a single GPU.

4. The computer-implemented method of claim 1, further comprising:
associating bounding boxes across different pictures to obtain object tracks;
processing the bounding boxes to determine camera pose; and
localizing objects encapsulated by the bounding boxes responsive to the object tracks and the camera pose to provide refined object tracks for forming the at least one top-view map.

5. The computer-implemented method of claim 4, wherein the refined object tracks are provided to be consistent over a given time period.

6. The computer-implemented method of claim 4, further comprising generating a confidence score for each of the bounding boxes, and wherein the confidence score is used to obtain the object tracks.

7. The computer-implemented method of claim 1, wherein the multi-task CNN comprises a plurality of sub-CNNs, each of the plurality of sub-CNNs for processing a respective different one of the different perception tasks.

8. The computer-implemented method of claim 1, further comprising training the multi-task CNN using training data comprising two-dimensional object boxes, three-dimensional object boxes, sparse three-dimensional points, and semantic pixels.

9. The computer-implemented method of claim 8, wherein the training data is annotated for a respective of the different perception tasks.

10. The computer-implemented method of claim 1, wherein each of the semantic pixels are assigned to one of a plurality of available semantic categories.

11. The computer-implemented method of claim 1, further comprising forming the top-view map using occlusion reasoning, the occlusion reasoning estimating semantics and distances for any pixels in the input video stream occluded by foreground objects.

12. The computer-implemented method of claim 11, wherein occluded areas of a scene in a frame of the input video stream are unannotated for the occlusion reasoning.

13. The computer-implemented method of claim 1, wherein the collision avoidance comprises controlling a vehicle input selected from a group consisting of braking and steering.

14. The computer-implemented method of claim 1, further comprising performing a scene understanding task responsive to the top-view map to aid in the collision avoidance.

15. A computer program product for advanced driver-assistance, the computer program product comprising a non-transitory computer readable storage medium having program instructions embodied therewith, the program instructions executable by a computer to cause the computer to perform a method comprising: extracting, by a hardware processor of the computer from an input video stream comprising a plurality of images using a multi-task Convolutional Neural Network (CNN), shared features across different perception tasks, the different perception tasks comprising object detection and other perception tasks; concurrently solving, using the multi-task CNN, the different perception tasks in a single pass by concurrently processing corresponding ones of the shared features by respective different branches of the multi-task CNN to provide a plurality of different perception task outputs, each of the respective different branches corresponding to a respective one of the different perception tasks; forming a parametric representation of a driving scene as at least one top-view map responsive to the plurality of different perception task outputs; and controlling an operation of a vehicle for collision avoidance responsive to the at least one top-view map indicating an impending collision.

16. The computer program product of claim 15, wherein the other perception tasks comprise semantic segmentation, depth estimation, and occlusion reasoning.

17. The computer program product of claim 15, wherein the hardware processor consists of a single GPU.

18. The computer program product of claim 15, further comprising:
    associating bounding boxes across different pictures to obtain object tracks;
    processing the bounding boxes to determine camera pose; and
    localizing objects encapsulated by the bounding boxes responsive to the object tracks and the camera pose to provide refined object tracks for forming the at least one top-view map.

19. The computer program product of claim 15, wherein the multi-task CNN comprises a plurality of sub-CNNs, each of the plurality of sub-CNNs for processing a respective different one of the different perception tasks.

20. A computer processing system for advanced driver-assistance, comprising: a memory device including program code stored thereon; a hardware processor, operatively coupled to the memory device, and configured to run the program code stored on the memory device to extract, from an input video stream comprising a plurality of images using a multi-task Convolutional Neural Network (CNN), shared features across different perception tasks, the different perception tasks comprising object detection and other perception tasks; concurrently solve, using the multi-task CNN, the different perception tasks in a single pass by concurrently processing corresponding ones of the shared features by respective different branches of the multi-task CNN to provide a plurality of different perception task outputs, each of the respective different branches corresponding to a respective one of the different perception tasks; form a parametric representation of a driving scene as at least one top-view map responsive to the plurality of different perception task outputs; and control an operation of a vehicle for collision avoidance responsive to the at least one top-view map indicating an impending collision.

* * * * *